United States Patent [19]

Meier et al.

[11] Patent Number: 5,196,735
[45] Date of Patent: Mar. 23, 1993

[54] CIRCUIT ARRANGEMENT

[75] Inventors: Herbert Meier, Moosburg; Martin Sellmeir, Neufinsing, both of Fed. Rep. of Germany

[73] Assignee: Texas Instruments Deutschland GmbH, Fed. Rep. of Germany

[21] Appl. No.: 715,318

[22] Filed: Jun. 14, 1991

Related U.S. Application Data

[63] Continuation of Ser. No. 496,391, Mar. 20, 1990, abandoned.

[51] Int. Cl.$^5$ .............................................. H03K 3/02
[52] U.S. Cl. .................................... 307/260; 307/108; 307/358
[58] Field of Search ...................... 307/246, 296.1, 260, 307/296.4, 350, 358, 106, 107, 108, 261, 268; 328/67

[56] References Cited

U.S. PATENT DOCUMENTS

| | | | |
|---|---|---|---|
| 4,153,871 | 5/1979 | Loucks | 328/67 |
| 4,367,423 | 1/1983 | Hornung | 307/350 |
| 4,398,156 | 8/1983 | Aaland | 328/67 |

Primary Examiner—John Zazworsky
Attorney, Agent, or Firm—James C. Kesterson; Richard L. Donaldson

[57] ABSTRACT

A circuit arrangement is described with the aid of which a control signal can be indicated in dependence upon reaching a predetermined desired value voltage at an energy-storage element at the end of a charging cycle. In the course of said charging cycle the energy-storage element is charged by rectification of an HF carrier pulse. The circuit arrangement contains a signal-storage element (FF) which in the active state emits a control signal. Furthermore, an envelope detector circuit (DE, CE, RE, T2) is provided which furnishes a switching signal in dependence upon the termination of the HF carrier-oscillation pulse. A voltage comparator (R3, T3, R4, C2, R1, R2, OP) compares a voltage value dependent on the voltage value at the energy-storage element (CC) with a voltage value which is related to the voltage value at the energy-storage element (CC) in such a manner that in the presence of the desired voltage value at the energy-storage element (CC) the compared voltage values are equal. On identity of the compared voltage values the voltage comparator emits an activiating signal for the storage element (FF) which sets the latter to the active state. On receiving the control signal furnished by the envelope detector circuit a switching means (A1, A2, T1) applied to the voltage comparator the voltage at the energy-storage element (CC) as supply voltage while on receiving the control signal furnished by the signal-storage element (FF) it separates the voltage comparator from its supply voltage.

7 Claims, 1 Drawing Sheet

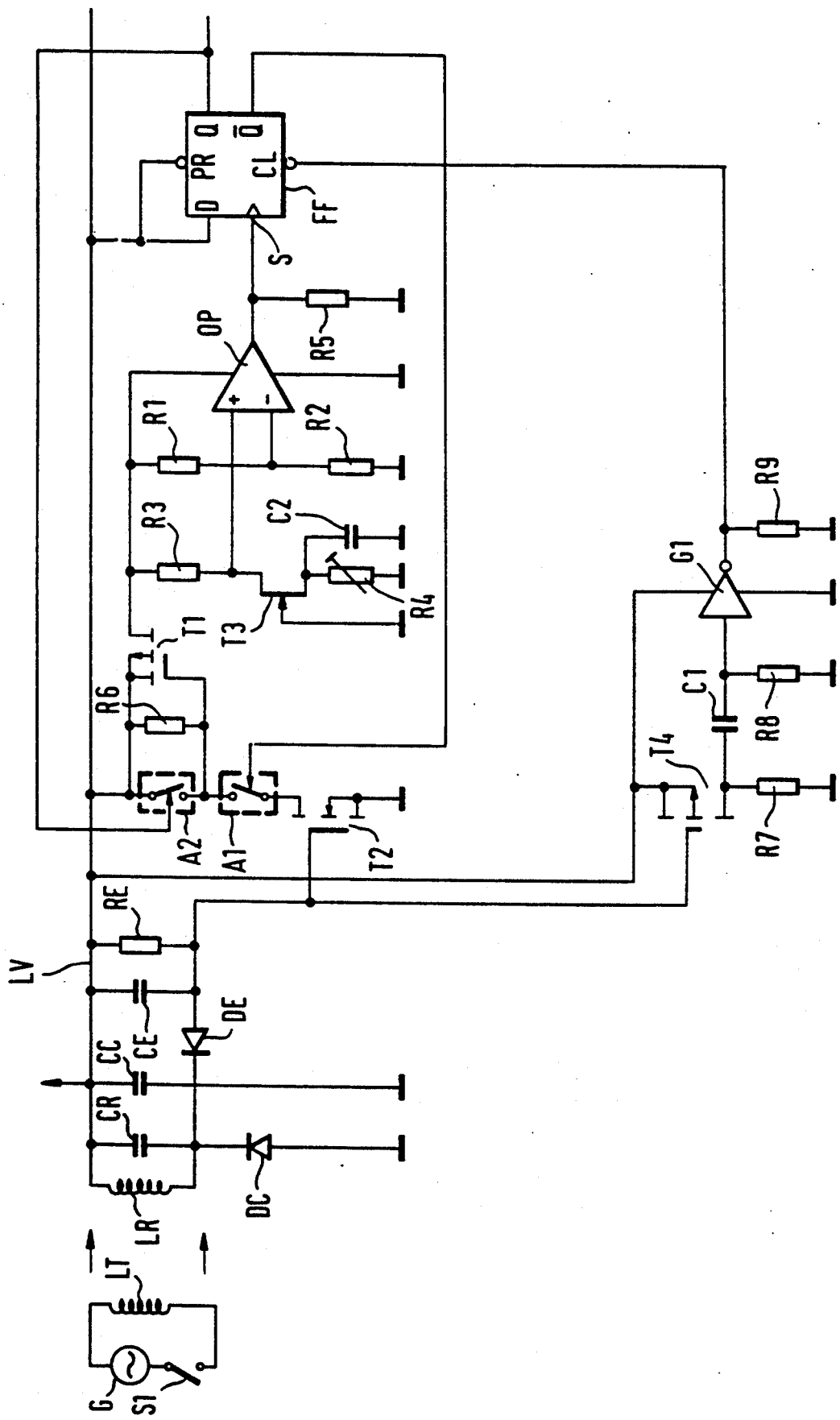

CIRCUIT ARRANGEMENT

This application is a continuation of application Ser. No. 07/496,391 filed Mar. 20, 1990, which is now abandoned.

The invention relates to a circuit arrangement for generating a control signal in dependence upon reaching a predetermined desired voltage value at an energy-storage element at the end of a charging cycle in the course of which the energy-storage element is charged by rectification of an HF carrier oscillation pulse.

Transponder systems exist in which an interrogator cooperates with a responder which does not contain its own power supply but draws its energy from an HF carrier-oscillation pulse transmitted by the interrogation device. The HF carrier-oscillation pulse stimulates in the responder a resonance circuit to oscillate, an energy-storage element being provided which is charged by rectification of the HF carrier-oscillation pulse. The purpose of the responder is to send back to the interrogator after termination of the HF carrier-oscillation pulse a message which contains informative data, for example an identification code group which permits a clear identification of the responder which sent the message back. A requirement for enabling the message to be sent back errorfree is that in the energy-storage element during the charging phase enough energy has been stored for an adequately large supply voltage to be available in the responder for the assemblies responsible for sending back the message. Means must be provided with which it is possible after termination of the carrier-oscillation pulse to determine whether the energy-storage element has been charged enough and the supply voltage necessary for sending back the message is available.

The invention is based on the problem of providing a circuit arrangement with the aid of which it is possible to indicate the presence of a desired supply voltage at the energy-storage element, said circuit arrangement itself having only a very low energy consumption to permit optimum use of the energy contained in the energy-storage element for other purposes.

According to the invention this problem is solved by a signal-storage element which in the active state emits the control signal, an envelope detector circuit which in dependence upon the termination of the HF carrier-oscillation pulse furnishes a switching signal, a voltage comparator which compares a voltage value dependent on the voltage value at the energy-storage element with a voltage value which is related to the voltage value at the energy-storage element in such a manner that in the presence of the desired voltage value at the energy-storage element the compared voltage values are equal, the voltage comparator emitting on identity of the compared voltage values an activating signal for the signal-storage element which sets the latter to the active state, and a switch means which on receiving the switching signal furnished by the envelope detector circuit applies the voltage at the energy-storage element as supply voltage to the voltage comparator and on receiving the control signal furnished by the signal-storage element separates the voltage comparator from its supply voltage.

When using the circuit arrangement according to the invention the components responsible for detecting the presence of the desired voltage value are only momentarily connected to the supply voltage and accordingly they are operative only for a short time as current consumers in the circuit arrangement. As soon as the presence of the desired voltage value has been detected the signal-storage element is set in the state in which it furnishes the control signal indicating said presence and at the same time the supply voltage is again separated from the components detecting the presence of the desired voltage value. In this manner the entire energy stored in the energy-storage element is available for the operation of further components.

Advantageous further developments of the invention are characterized in the subsidiary claims.

The invention will now be described by way of example with the aid of the drawing, the single FIGURE of which shows a circuit diagram of the circuit arrangement according to the invention.

The description of the circuit arrangement illustrated in the drawing will be made in relationship to a transponder system comprising an interrogator and a responder. Of the interrogator, in the drawing only an HF carrier-oscillation generator G is illustrated, the output signals of which are applied via a switch S1 to a transmitting coil LT. Of the responder, only the part is shown which acts as circuit arrangement for generating a control signal which indicates that a desired voltage value is present at an energy-storage element CC.

In the transponder system the energy-storage element CC is charged by momentarily closing the switch S1 in the interrogator which leads to the HF carrier oscillations being sent to the responder in the form of an HF carrier-oscillation pulse as is symbolically indicated by the arrows shown in the drawing. The resonance circuit comprising the coil LR and the capacitor CR contained in the responder is tuned to the frequency of the HF carrier oscillations so that said resonance circuit is stimulated to oscillate. By means of the diode DC the HF carrier oscillations are subjected to a half-wave rectification and this leads to charging up of the capacitor forming the energy-storage element CC. As long as no voltage is supplied to the energy-storage element CC the analog switches A1 and A2 contained in the circuit arrangement illustrated are open, i.e. have higher resistance. Due to the high-resistance state of the analog switch A2 the resistor R6 present between the gate electrode and the source electrode of a P-channel MOS field-effect transistor T1 is effective and keeps said transistor nonconductive. Due to the blocking action of the transistor T1 no supply voltage reaches an operational amplifier OP either so that said amplifier also cannot consume any current. Also, in this operating phase no current can flow through the voltage divider which is formed by the resistor R1 and the resistor R2 and the tap of which is connected to the negative input of the operational amplifier OP. The same applies to the further voltage divider which is formed by the resistor R3 and a current source consisting of an N-channel field-effect transistor T3 and a variable resistor R4. For a purpose still to be explained a capacitor C2 is connected in parallel with the variable resistor R4.

Connected to the output of the operational amplifier OP is the switching input S of a flip-flop FF which serves as signal-storage element and which in the active state furnishes at its output Q a signal with the value "1".

The diode DE, the capacitor CE and the resistor RE form in conjunction with the MOS field-effect transistor T2 an envelope detector circuit with the aid of which it is possible to detect when the HF carrier-oscillation pulse received by the resonance circuit comprising the coil LR and the capacitor CR terminates.

The N-channel MOS field-effect transistor T4, the resistor R7, the capacitor C1, the resistor R8, the negator G1 and the resistor R9 form together a reset circuit which effects resetting of the flip-flop FF to an inactive circuit state as soon as the charge voltage at the energy-storage element CC begins to rise with the start of reception of an HF carrier-oscillation pulse.

The circuit arrangement behaves as follows:

As already mentioned, reception of an HF carrier-oscillation pulse by the resonance circuit LR, CR leads to charging of the energy-storage element CC due to the rectifier action of the diode DC. At the same time the capacitor CE is also charged so that the voltage applied thereto rises. As soon as the voltage at said capacitor CE exceeds the threshold value of the MOS field-effect transistor T4 a positive voltage jump is generated at the resistor R7 and is differentiated by the differentiating member comprising the capacitor C1 and the resistor R8 so that at the output of the negator G1 a negative voltage pulse momentarily arises which is supplied to the switching input CL of the flip-flop FF so that thelatter is set to the inactive reset state in which it generates at its output Q a signal with the value "0" and at its output Q a signal with the value "1". Said signal at the output Q of the flip-flop FF activates the analog switch A1 so that the latter moves to the low-resistance state thereby arming the control signal generating circuitry.

The purpose of the function sequence described so far is to set the circuit arrangement immediately after start of the HF carrier-oscillation pulse to a defined initial state in which the flip-flop FF used as signal-storage element certainly does not emit the control signal which indicates the presence of a desired voltage value at the energy-storage element CC and no unnecessary current consumers are active.

After a predetermined period of time the HF carrier-oscillation pulse terminates so that it must now be checked whether at the energy-storage element CC the desired voltage value which is utilized for further assemblies in the responder as supply voltage has been reached.

Since the resonance circuit comprising the coil LR and the capacitor CR is no longer externally energized the oscillation amplitude starts to drop at a greater or lesser rate in accordance with the circuit quality, triggering the envelope detector into sending out the switching signal. The resistor RE of the envelope detector circuit discharges the capacitor CE in accordance with the oscillation amplitude but the voltage at the line LV, which serves as supply voltage, still remains constant due to the storing effect of the energy-storage element CC. As a result the voltage at the gate electrode of the MOS field-effect transistor T2 rises so that the latter changes to the conductive state. As mentioned, the analog switch A1 is of low resistance whilst the analog switch A2 is of high resistance and as a result the gate electrode of the MOS field-effect transistor T1 is applied to ground. The consequence of this is that said MOS field-effect transistor T1 goes to the conductive state. The operational amplifier OP is thereby supplied with voltage.

The operational amplifier OP acts in the circuit arrangement illustrated as voltage comparator comparing with each other the voltages supplied to its inputs. The resistors R1 and R2 have equal values so that at the negative input of the operational amplifier OP half the supply voltage is always present. At the positive input of the operational amplifier OP however a voltage is present of which the magnitude is dimensioned in each case so that when the supply voltage of the operational amplifier OP corresponds to the desired voltage value the voltage at the positive input of said operational amplifier OP is also equal to half the supply voltage. This is achieved in the following manner:

The voltage divider, the tap of which is connected to the positive input of the operational amplifier OP, contains in the form of the field-effect transistor T3 and the resistor R4 a constant current source which ensures that the same current always flows through the series circuit comprising the resistor R3 and the field-effect transistor T3 as well as the resistor R4. To ensure this, the resistance of the field-effect transistor T3, depending on the voltage applied to the voltage divider, always assumes a higher resistance or lower resistance to the extent that the desired constant current flows. If for example the voltage at the voltage divider becomes higher the field-effect transistor T3 assumes a higher resistance so that the current does not rise beyond the predetermined constant current value. If however the voltage at the voltage divider becomes smaller the resistance of the field-effect transistor T3 becomes smaller so that more current can flow for maintaining the constant current value. The constant current value is set so that at the positive input of the operational amplifier OP in the presence of the desired voltage value at the energy-storage element CC the voltage $V_{TH}/2$ arises, VTH being the threshold voltage at which the flip-flop FF changes its switching state when said voltage value is applied to its switching input S.

If on forward switching of the MOS field-effect transistor T1 the voltage at the negative input of the operational amplifier OP exceeds the fixedly predefined voltage $V_{TH}/2$ at the positive input of said operational amplifier OP, the latter emits at its output an activating signal which sets the flip-flop FF to the active state in which the latter furnishes at its output Q the control signal which indicates the presence of the desired voltage value at the energystorage element CC. The capacitor C2 connected in parallel with the resistor R4 ensures a delayed rise of the voltage at the positive input of the operational amplifier OP to ensure that the voltage at the negative input reaches the final value before the voltage comparison is carried out.

The control signal with the value "1" emitted at the output Q of the flip-flop FF switches the analog switch A2 to the low-resistance state whilst the signal at the output Q with the value "0" switches the analog switch A1 to the highresistance state. As a result the MOS field-effect transistor T1 is immediately rendered non-conductive so that no more current can flow through the operational amplifier OP and the voltage dividers associated therewith. The energy stored in the energy-storage element CC is therefore available for use as supply energy in further circuit units not illustrated in the drawing. The operation of said further assemblies can be activated with the aid of the control signal generated by the flip-flop FF.

We claim:

1. Circuitry for generating a control signal comprising:
    an energy storage element operable to be charged by a carrier oscillation pulse and having a voltage level representative of the amount of energy stored;

a detection circuit for generating a switching signal in response to the termination of said carrier oscillation pulse, and;

signal generating circuitry activated by said switching signal, said signal generating circuitry generating said control signal when said voltage level of said energy storage element is substantially equal to a selected value, said generated control signal deactivating said signal generating circuitry.

2. The circuitry of claim 1 wherein said signal generating circuitry comprises:

a signal storage element for providing said control signal in response to a first input, and;

a voltage comparator circuit for comparing said voltage level of said energy storage element to said selected value and generating said first input when said voltage level and said selected value are substantially equal.

3. The circuit of claim 2, further comprising reset circuitry for generating a second input in response to the reception of said carrier oscillation pulse and wherein said signal storage element is operable to further provide a signal to arm said signal generating circuitry in response to said second input.

4. The circuit according to claim 2, wherein said voltage comparator circuit comprises:

two voltage dividers, one of said voltage dividers including a constant current source; and, an operational amplifier having two inputs connected respectively to the center taps of said voltage dividers, and an output connected to said first input of said signal-storage element.

5. The circuit according to claim 3, wherein said reset circuitry comprises:

a first capacitor operable to be charged simultaneously with the energy-storage element;

a load resistor;

a transistor for generating a voltage increase across said load resistor when the voltage level of said capacitor exceeds the threshold voltage of said transistor; and a differentiating circuit for differentiating the voltage increase from said transistor, and for providing said second input to said signal-storage element.

6. The circuit of claim 1, wherein said detection circuit comprises:

a transistor operable to move to a low resistance state at the termination of the carrier oscillation pulse.

7. The circuit of claim 2, wherein said signal-storage element has a "Q" and a "$\overline{Q}$" output, and said signal-storage element provides said control signal, having a value of "1" at said "Q" output, and another signal, having a value of "0" at said "$\overline{Q}$" output upon receipt of said first input.

* * * * *